Aug. 14, 1945.         S. BERGMAN                2,382,390
SOLDERING IRON
Filed Dec. 17, 1942
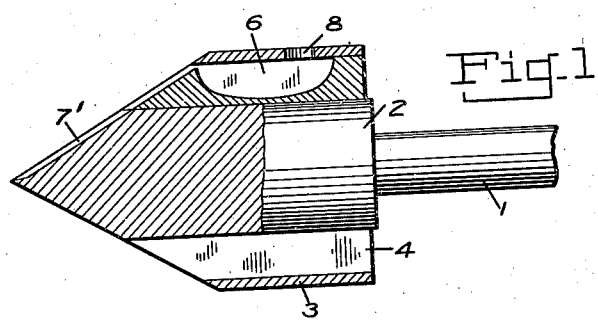
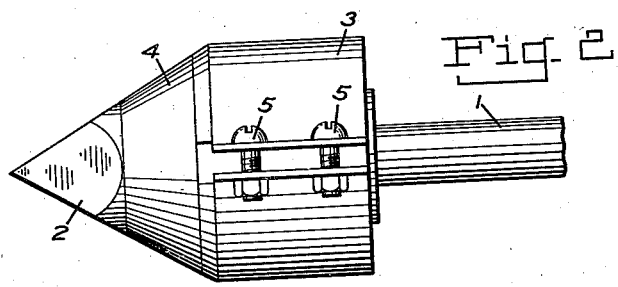
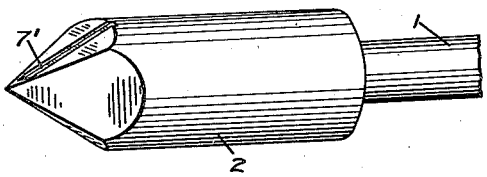
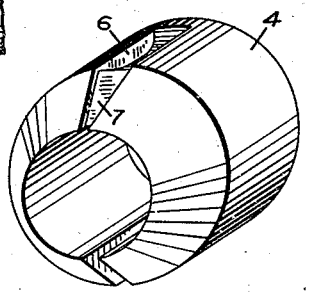
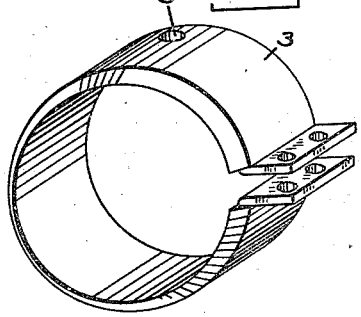
Inventor
Seymour Bergman
By C. E. Hevrstrom & H. E. Thibodeau
Attorneys Patented Aug. 14, 1945

2,382,390

UNITED STATES PATENT OFFICE 2,382,390

SOLDERING IRON

Seymour Bergman, Dover, N. J.

Application December 17, 1942, Serial No. 469,291

3 Claims. (Cl. 113—109)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improvement in soldering irons, and more particularly to providing means for automatic flow of solder to an object worked upon.

At present in the operation of soldering irons, the worker holds the iron in one hand and the reel or stick of solder in the other. By this manner of operation no hand is left free to manipulate the object worked upon. Another objection to this mode of operation is that there is a considerable amount of wastage, as the operator can not readily manipulate small sections of solder in his hand.

The primary object of the present invention is to provide means for a continuous flow of solder, which can be readily regulated by affixing to any conventional type of electric or flame heated soldering iron, the device hereinafter described.

An important feature of the invention is that by utilizing the device herein described, a considerable saving of the critical item of solder can be effected. This saving is made possible by utilizing small pieces and bits of solder that might otherwise be wasted.

The invention claimed can best be understood from the following description to be read in view of the single sheet of drawing in which:

Figure 1 is a part cross sectional view of the preferred embodiment of the improved soldering iron;

Figure 2 is a side view of the same;

Figure 3 is a side view of the iron without the collar attached;

Figure 4 is a view in perspective of the collar, showing details of the invention, and Figure 5 is a view in perspective of the clamp, forming part of the invention.

Referring to the drawing 1 indicates a shank of an electrically heated soldering iron with extensions forming the normally enlarged heating element portion 2 with resistance wires (not shown) contained therein. Affixed to the heating element 2 is an elongated split collar 4 which may if desired completely encircle the heating element 2. Collar 4 is held firmly in position by clamp 3 and screws 5 or any other like means. Positioned within the collar 4 and forming part thereof is a well 6 adapted to hold molten solder. Extending from the upper portion of well 6 is a channel or passageway 7 which extends in decreasing width from the well to the forward end of the collar where it registers with the groove 7' which extends to the extreme tip of the iron. Passageways 7 and 7' are of sufficient width and depth to permit free flow of molten solder therethrough to the working tip of the soldering iron. An opening 8 is provided in the clamp 3 through which solder may be introduced into the well 6.

In the operation of the soldering iron embodying the structural features described above, portions of solder are fed into the well 6 through the opening 8. The soldering iron is then heated electrically and the small portions of solder contained in well 6 will become molten in a relatively short time. At the moment the solder becomes molten the iron is ready for use and tilting of the iron will permit the solder to flow through passageway 7 into the object worked upon. It is of course obvious that the rate of feed of solder can be readily controlled by the degree of tilting of the iron.

While the invention herein claimed has been described in connection with electric soldering irons, it is apparent that the same structural features can be applied to any flame fired type soldering iron.

Having thus described the invention what is claimed as new is:

1. A soldering iron comprising a shank having a heating element formed with a tapered and pointed front end and having a groove in its tapered portion extending to the apex thereof, a collar surrounding the heating element and terminating at its forward end at the inner end of said groove, said collar being formed with a tapered forward end and a solder-receiving well in its periphery and a solder passage in its tapered portion opening at its upper end into said well and at its lower end registering with the groove in the tapered portion of the heating element so as to form a continuous passage for the molten solder from the well to the apex of the heating element, and means surrounding the said collar and separable therefrom for retaining the molten solder in the well in various positions of the iron.

2. The invention of claim 1 said solder retaining means comprising a band provided with an opening adjacent the rear end thereof for the introduction of cold solder to said well.

3. The invention of claim 1 characterized in that the molten solder passage from the well in the collar to the heating element narrows from the well to its point of registry with the upper end of the groove in the heating element.

SEYMOUR BERGMAN.